United States Patent
Choi

(10) Patent No.: US 6,860,683 B2
(45) Date of Patent: Mar. 1, 2005

(54) SPINDLE ASSEMBLY FOR MACHINE TOOL

(75) Inventor: Jae-Ho Choi, Ulsan (KR)

(73) Assignee: Hyundai Motor Company, Seoul (KR)

( * ) Notice: Subject to any disclaimer, the term of this patent is extended or adjusted under 35 U.S.C. 154(b) by 161 days.

(21) Appl. No.: 10/321,096

(22) Filed: Dec. 16, 2002

(65) Prior Publication Data

US 2003/0223834 A1 Dec. 4, 2003

(30) Foreign Application Priority Data

May 31, 2002 (KR) .......................................... 2002-30665

(51) Int. Cl.[7] .............................. B23C 1/00; B23C 5/26
(52) U.S. Cl. ........................ 409/136; 409/233; 408/239
(58) Field of Search ................................ 409/233, 135, 409/136, 232, 239 R, 240; 408/239 R, 240

(56) References Cited

U.S. PATENT DOCUMENTS

| | | | | |
|---|---|---|---|---|
| 4,290,720 A | * | 9/1981 | Ferreira ...................... | 409/233 |
| 4,748,357 A | * | 5/1988 | Kempken ................... | 409/233 |
| 4,915,553 A | * | 4/1990 | Lazarevic ................... | 409/233 |
| 5,033,922 A | * | 7/1991 | Watanabe et al. ........... | 409/233 |
| 5,613,929 A | * | 3/1997 | Bayer ......................... | 409/233 |
| 5,639,194 A | * | 6/1997 | Harroun ...................... | 409/233 |
| 5,662,442 A | * | 9/1997 | Taki et al. .................. | 409/233 |
| 6,287,059 B1 | * | 9/2001 | Hashidate et al. .......... | 409/233 |

FOREIGN PATENT DOCUMENTS

DE           3629453           3/1988

* cited by examiner

Primary Examiner—A. L. Wellington
Assistant Examiner—Dana Ross
(74) Attorney, Agent, or Firm—Morgan Lewis & Bockius LLP

(57) ABSTRACT

A spindle assembly for a machine tool wherein a rear end portion of the spindle is structured to allow the spindle to be operated at higher speeds, thereby enhancing precision. The spindle assembly includes a spindle mounted within a spindle housing able to undergo rotation by a rotor and bearings. A collet directly secures and releases a tool inside the spindle. A draw bar, one end of which is connected to the collet through a sleeve within the spindle, operates the collet. A piston and cylinder connected to the draw bar moves the draw bar in forward and reverse directions. A rotary joint supplies cutting oil to the spindle. An adapting arrangement connects a rear end of the draw bar and the rotary joint to allow forward and reverse movement with respect to the spindle.

3 Claims, 2 Drawing Sheets

SPINDLE ASSEMBLY FOR MACHINE TOOL

FIELD OF THE INVENTION

The present invention relates to a spindle assembly for a machine tool; and, more particularly, to a spindle assembly that provides reduced vibration at higher speeds.

BACKGROUND OF THE INVENTION

Modern machine tools are becoming increasingly automated and faster in operation in order to more precisely and quickly process a workpiece. Examples of such machine tools are boring machines, milling machines, drilling machines, and machining centers, which combine into a single unit a boring machine, milling machine, and a drilling machine.

A boring machine operates to enlarge (to specific dimensions) the size of an existing hole in a workpiece. A milling machine rotates suitable milling cutters to enable complicated cutting operations on a workpiece including planar cutting, groove cutting, general straight cutting, etc. A drilling machine mounts a cutting tool such as a drill in a rotating spindle, and the spindle is rotated then lowered and raised to form a hole in the workpiece.

A machining center is a machine tool that allows for multiple axis processing and multiple production processing through rectilinear, rotational, and spindle rotational motion, and by only a single setting. In a numerical control machine tool, which is another name for a machining center, movement of a cutting tool or the number of rotations of a spindle is pre-recorded on a punch tape as needed (according to a particular design). The punch tape is supplied to a control unit that operates to precisely and automatically realize a complicated workpiece design. The punch tape may be used for subsequent workpieces so that multiple, identical workpieces may be formed.

In such machine tools, typically a suitable tool is mounted in a spindle that is rotated by a motor (typically referred to as a spindle motor), and the rotating tool processes a workpiece. Generally, a spindle is mounted within a spindle housing and a tool having a concentric catch protrusion is received and secured in an end of the spindle. A collet securely holds and releases the catch protrusion of the tool. A plurality of bearings are interposed between a front end portion and a rear end portion of the spindle and the spindle housing. The bearings allow rotation of the spindle with respect to the spindle housing. Also, to support a rear end portion of the spindle, a needle bearing may be used. Lubricant may be supplied through a lubrication hole formed in the support structure around the needle bearing. In order to permit forward and reverse motion as well as rotational motion of the spindle, there are gaps associated with the bearings, in particular the needle bearing.

However, a number of drawbacks exist in conventional spindle assemblies. For example, if the rotational speed of the spindle is increased for high-speed operation, the bearing gap causes the generation of rotational vibration such that the precision in the processes performed on the workpiece is reduced and/or noise is generated. It also becomes necessary that the processes be performed in accordance with the supply of a lubricant for needle bearing lubrication and cooling.

SUMMARY OF THE INVENTION

The present invention provides a spindle assembly for a machine tool, in which precision of the machine tool may be maintained at all speeds, including high speeds, thereby increasing the range of speeds at which the machine tool can be operated. In a preferred embodiment, the present invention includes a spindle mounted within a spindle housing able to undergo rotation by a rotor and bearings. A collet directly secures and releases a tool inside the spindle. A draw bar, one end of which is connected to the collet through a sleeve, is disposed within the spindle to operate the collet. The draw bar is rotatably driven together with the spindle. A piston and a cylinder are connected to the draw bar to move the draw bar in forward and reverse directions. A rotary joint supplies cutting oil to the spindle. An adapting arrangement connects a rear end of the draw bar and the rotary joint, preferably as an integral unit, to allow forward and reverse movement with respect to the spindle.

The adapting arrangement preferably includes a connecting adaptor connected to a rear outer circumference of the draw bar within a rear end portion of the spindle. The connecting adaptor supports a rear end of the draw bar in such a manner as to allow for motion in a long axis direction of the spindle. A pusher connects one end of the rotary joint and the connecting adaptor at the rear end portion of the spindle. The pusher is mounted such that it may be partly inserted into and removed from the inside of the rear end portion of the spindle. A ring-shaped bushing is interposed between an inner surface of the spindle and an outer surface of the connecting adaptor and the pusher. The bushing acts as a guide to allow the sliding of the connecting adaptor and the pusher along the inner surface of the spindle and along the long axis direction of the spindle.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
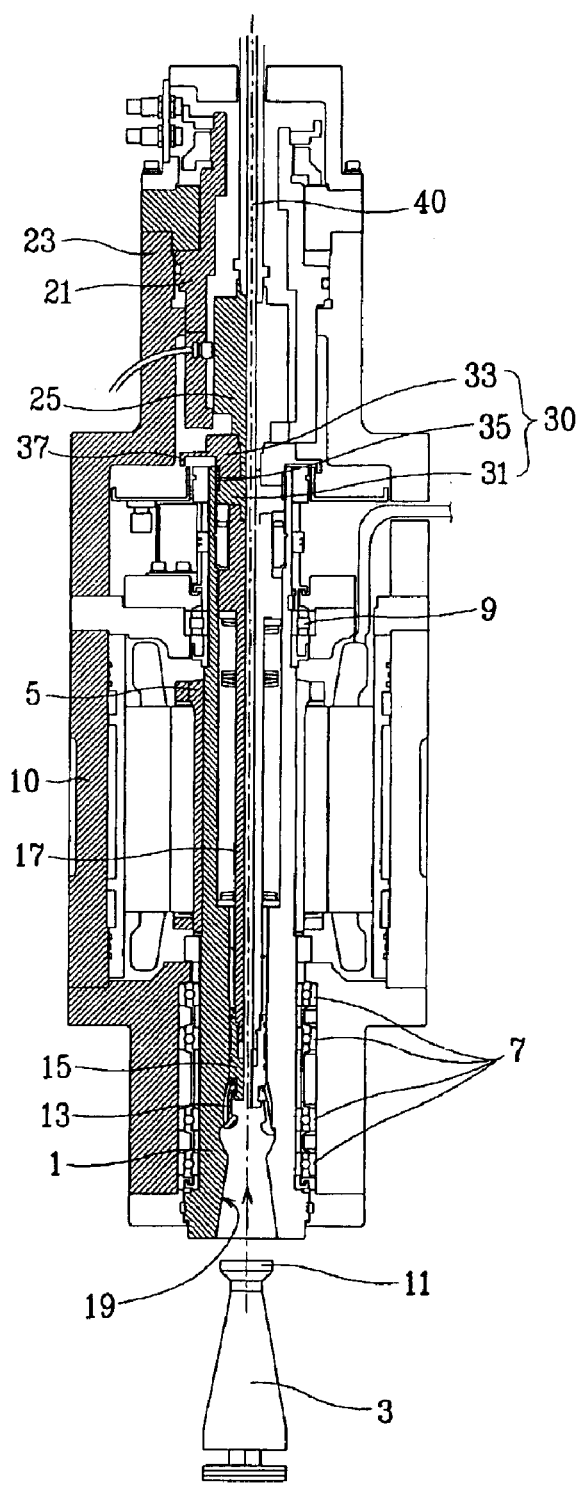
FIG. 1 is a sectional view of spindle assembly for a machine tool in a state mounted in a housing according to a preferred embodiment of the present invention.
Figure 2:
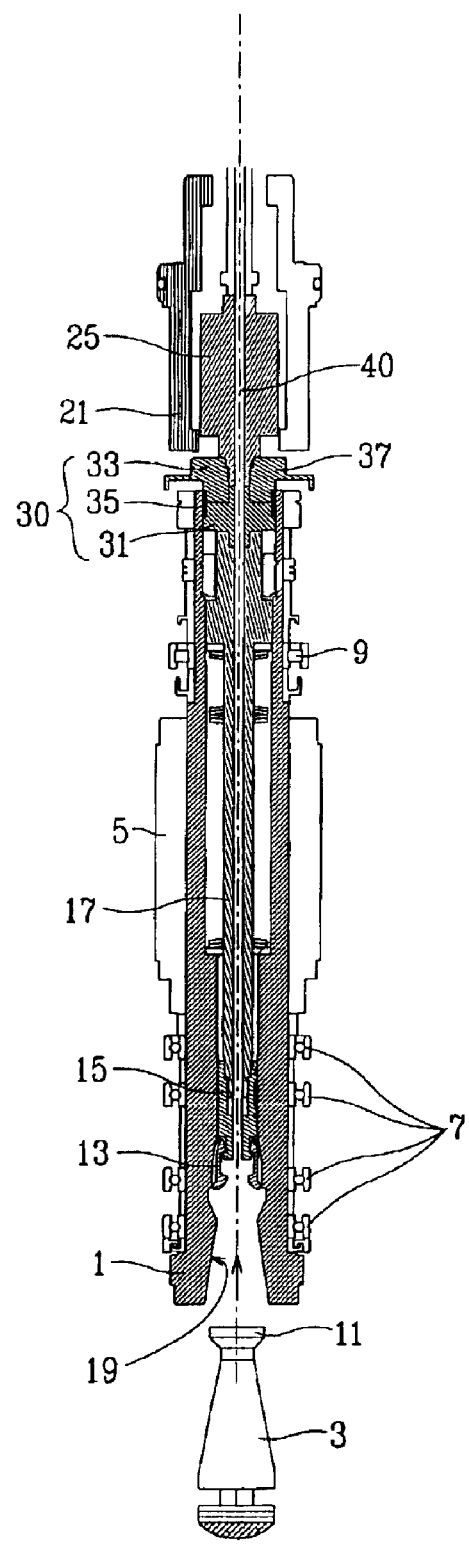
FIG. 2 is a sectional view of the spindle assembly of FIG. 1.

In FIG. 1, a left side of the spindle assembly from a center axis of the same according to one embodiment of the invention is shown (together with a housing 10). Draw bar 17 is upwardly positioned as if a tool 3 is connected to the spindle assembly. The right side of the spindle assembly from the center axis of the same is shown (together with the housing 10) with the draw bar 17 downwardly positioned ready to accept the tool 3.

A spindle assembly for a machine tool according to a preferred embodiment of the present invention generally comprises a rotating member that performs processing operations such as cutting and forming holes by application to a boring machine, a milling machine, a drilling machine, or a machining center, which combines into a single unit a boring machine, a milling machine, and a drilling machine. The spindle assembly is rotated at a high speed by a spindle motor (not shown) such that the tool 3, mounted to a lower end of the spindle assembly, is rotated, thereby allowing a workpiece to be shaped, cut, etc.

Plural bearings 7 are interposed between a front end portion of spindle 1, to which the tool 3 is mounted, and the housing 10. A bearing 9 is interposed between a rear end portion of the spindle 1 and the housing 10. The spindle 1 rotates within the housing 10 by operation of a rotor 5 and by sliding on the bearings 7 and 9.

A collet 13 is mounted within the spindle 1. The collet 13 securely holds and releases a catch protrusion 11 of the tool 3. Also, a sleeve 15 is connected to an upper portion of the collet 13 in such a manner as to allow the sleeve 15 to undergo forward and reverse movement. The sleeve 15 acts as a guide to allow the smooth movement of the collet 13.

Further, a long, rod-shaped draw bar 17 is provided in the spindle 1. The draw bar 17 is connected to the collet 13 through the sleeve 15 and with a structure able to undergo forward and reverse movement. The end of the spindle 1 to which the tool 3 is inserted includes a mounting opening 19, which is tapered to have a decreasing circumference in a direction toward the collet 13 and extending to reach the same. An area of the tool 3 for mounting is also tapered to correspond to the tapering of the mounting opening 19.

A piston 21 is connected to the draw bar 17 at a rear end portion of the same. The piston 21 operates so that the draw bar 17 is moved in forward and reverse directions. Further, a cylinder 23 is provided to the outside of the piston 21 and a rotary joint 25 is provided to the inside of the piston 21. The rotary joint 25 supplies cutting oil and is connected to the draw bar 17.

With respect to the connection of the draw bar 17 and the rotary joint 25, a rear end (upper end in the drawing) of the draw bar 17 is integrally connected to the rotary joint 25 through an adapting arrangement 30 so as to allow forward and reverse movement of these connected elements, where forward and reverse refer to motion in a long-axis direction of the spindle 1 with the reverse or rear referring to an upper portion in the drawing. The adapting arrangement 30 includes a connecting adaptor 31, which is connected to a rear outer circumference of the draw bar 17 within a rear end portion (upper portion in the drawing) of the spindle 1. The connecting adaptor 31 supports the rear end of the draw bar 17 in such a manner as to allow for motion in a long axis direction of the spindle 1.

The adapting arrangement 30 also includes a pusher 33. The pusher 33 connects one end of the rotary joint 25 and the connecting adaptor 31 at the rear end portion of the spindle 1. Also, the pusher 33 is mounted such that it may be partly inserted into and removed from the inside of the rear end portion of the spindle 1.

In addition, a ring-shaped bushing 35 is interposed between an inner surface of the spindle 1 and an outer surface of the connecting adaptor 31 and the pusher 33. That is, the bushing 35 is interposed between the inner surface of the spindle 1 at an area where the connecting adaptor 31 and the pusher 33 meet. The bushing 35 acts as a guide to allow the sliding of the connecting adaptor 31 and the pusher 33 along the inner surface of the spindle 1 and along a long axis direction of the same. A preferable gap between the bushing 35 and the inner surface of the spindle 1 is approximately 0.007–0.040 mm.

To prevent the pusher 33 from being inserted into the rear end portion of the spindle 1 past a predetermined amount, a stopper 37 extends from the pusher 33. Preferably, stopper 37 is integrally formed around the pusher 33.

Passageway 40 is formed in a long axis direction of the spindle 1 and in centers of the rotary joint 25, the pusher 33, the connecting adaptor 31, and the draw bar 17. Cutting oil is supplied through the passageway 40.

With a spindle assembly for machine tools according to a preferred embodiment as described above, a conventional rod and needle bearing for connecting the rotary joint and the draw bar are unneeded such that the length of the spindle may be decreased. As a result, the gap associated with the needle bearing that generates rotational vibration in prior spindles may be omitted from the structure. Therefore, the rotational speed of spindles made in accordance with an embodiment of the present invention may be increased without experiencing rotational vibration, even in the case where high-speed operation past a prescribed value is performed. This results in an improvement in the precision with which the processes performed on a workpiece, reduction in noise, and the ability to omit the conventional structure for needle bearing lubrication and cooling.

In the spindle assembly for machine tools according to a preferred embodiment of the present invention described above, the rear end portion of the spindle is re-structured using the adapting arrangement so that undesirable structural elements found in the prior art may be removed. Accordingly, the precision of the processes performed on a workpiece by the spindle is improved, the wear resistance of the bearings is improved, and the process speed is increased to thereby improve productivity.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A spindle assembly for a machine tool, comprising:
    a spindle mounted within a spindle housing for rotation and translation;
    a collet directly securing and releasing a tool inside the spindle;
    a draw bar, one end of which is connected to the collet through a sleeve within the spindle to operate the collet, the draw bar being rotatably driven together with the spindle;
    a piston and a cylinder connected to the draw bar to move the draw bar in forward and reverse directions along a lone-axis of the spindle;
    a rotary joint for supplying cutting oil to the spindle;
    a connecting adaptor connected to a rear outer circumference of the draw bar within a rear end portion of the spindle, the connecting adaptor supporting a rear end of the draw bar in such a manner as to allow for motion in the lone axis direction of the spindle;
    a pusher connecting one end of the rotary joint and the connecting adaptor at the rear end portion of the spindle, the pusher being mounted such that the pusher may partly be inserted into and removed from the inside of the rear end portion of the spindle; and
    a ring-shaped bushing interposed between an inner surface of the spindle and an outer surface of the connecting adaptor and the pusher, the bushing acting as a guide to allow the sliding of the connecting adaptor and the pusher along the inner surface of the spindle and along the long axis direction of the spindle.

2. The spindle assembly of claim 1, further comprising a stopper coupled with the pusher, wherein said stopper extends from a predetermined position of the pusher such that the pusher is not inserted into the rear end portion of the spindle past a predetermined amount.

3. The spindle assembly of claim 1, wherein a gap between the bushing and the inner surface of the spindle is 0.007–0.040 mm.

* * * * *